United States Patent [19]
Rye

[11] Patent Number: 5,217,788
[45] Date of Patent: Jun. 8, 1993

[54] CORRUGATED SHEET ASSEMBLY

[75] Inventor: Palle Rye, Reading, Pa.

[73] Assignee: Brentwood Industries, Reading, Pa.

[21] Appl. No.: 885,720

[22] Filed: May 11, 1992

[51] Int. Cl.⁵ .................. B32B 3/28; B01D 47/00; C10J 1/08; F02M 17/28

[52] U.S. Cl. .................. 428/184; 428/182; 428/183; 428/185; 428/212; 52/798; 261/112.2

[58] Field of Search .............. 428/162, 183, 184, 185, 428/212, 192; 52/798, 795, 800; 261/112.2, DIG. 72

[56] References Cited

U.S. PATENT DOCUMENTS

| | | | |
|---|---|---|---|
| D. 254,207 | 2/1980 | Holmberg | D23/146 |
| 2,091,918 | 8/1937 | Finck | 428/185 |
| 2,793,017 | 5/1957 | Lake | 261/112 |
| 3,475,012 | 10/1969 | Britton et al. | 261/112 |
| 3,540,702 | 11/1970 | Uyama | 261/261 |
| 3,599,943 | 8/1971 | Munters | 261/95 |
| 3,733,063 | 5/1973 | Loetel et al. | 261/112 |
| 4,296,050 | 10/1981 | Meier | 261/112 |
| 4,344,899 | 8/1982 | Monjoie | 261/112 |
| 4,668,443 | 5/1987 | Rye | 261/112 |
| 4,800,047 | 1/1989 | Monjoie | 261/112.2 |

*Primary Examiner*—Donald J. Loney
*Attorney, Agent, or Firm*—Panitch, Schwarze, Jacobs & Nadel

[57] ABSTRACT

This invention relates to an assembly composed of a plurality of generally parallel corrugated contact sheets. The corrugations form alternating apices in the sheets. The apices are connected by angled walls. The corrugations in each sheet are substantially parallel and disposed at an oblique angle to an edge of the sheet. Adjacent sheets are oriented such that the corrugations of one sheet cross the corrugations of an adjacent sheet at intersections of the apices. The sheets have generally planar positioner pads positioned at least at some of the intersections of the apices of the corrugations of adjacent. The apices have indented portions between each positioner pad.

14 Claims, 2 Drawing Sheets

CORRUGATED SHEET ASSEMBLY

BACKGROUND OF THE INVENTION

This invention relates to an assembly of corrugated sheets of a particular structure and, more particularly, to an assembly which may be adapted primarily for use as heat transfer media or contact bodies, fill for gas scrubbers for reducing air pollution, media for trickling filters used in water and waste water treatment, media for use in air scrubbing or stripping equipment, and other surface media, although other uses are also contemplated for the assemblies, such as modular artificial reef systems for marine environments.

When the corrugated sheets forming the assembly are oriented in a generally vertical direction, the assembly of the present invention may be used as wet deck fill for evaporative-heat exchange apparatus. Such wet deck fill may, for example, be used in a cooling tower for air conditioning or other industrial processes. In many prior art evaporative-type heat exchangers, water is distributed over the top of wet deck fill formed of contact bodies. Generally, such contact bodies are in the form of corrugated sheet material. As the water flows over and down the fill, a thin film of water is formed over the surface of the fill. A gas stream, typically air, passes over the water film on the fill to provide an evaporative cooling effect. Air flow may be promoted by the use of a centrifugal blower or fan from top to bottom (parallel flow), transversely across the path of the water (crosscurrent) or in a direction opposite to the flow of the water, namely bottom to top (countercurrent). The structure of the present assembly provides increased surface area over typical prior art contact bodies, which facilitates heat transfer. In addition, the present assembly provides increased structural integrity over many prior art contact bodies.

The present invention is also useful as a modular artificial reef. An assembly formed from corrugated sheets of the present invention may be oriented as desired with respect to the floor of a body of water, such as a marine environment. For example, the assembly may be oriented in a generally horizontal or vertical direction. The sheets of the assembly may be formed from polyvinyl chloride, which attracts microbes required to establish a food-chain foundation for higher forms of marine life. Numerous chambers and openings within the assembly are advantageous in attracting fish. Studies have shown that fish tend to avoid large chambers or caverns, and chambers having only one opening. The increased surface area of the sheets of the present assembly provide a large surface area for shelter and forage. In addition, the numerous chambers and intricate passageways formed within the assembly of the present invention provide a natural attraction for fish and other marine life.

The prior art discloses many different contact bodies assembled from contact sheets having corrugations of varying types, shapes and configurations. For example, there is disclosed in the prior art a contact body having longitudinal and transverse corrugations. A plurality of sigmoidal ribs are disposed transversely of the sheet for spacing individual sheets. Small cup-like indentations are provided in the internal angle of each sigmoidal rib for accommodation within smaller indentations in the trough of the closest longitudinal corrugation to reduce or prevent movement of the individual elements in the assembly. The cups may be filled with adhesive for bonding the sheets together.

The prior art also discloses fill sheets for gas and liquid contact apparatus composed of alternating regions which have a curvilinear and angular profile, respectively. The regions are interconnected by intermediate regions which connect the curvilinear and angular profile regions. The sheet has at intervals along the crests of its corrugations spacer devices formed by flat portions and bosses for spacing and affixing adjacent sheets.

There is also disclosed in the prior art a crosscurrent gas and liquid contact body made of corrugated sheets. Each adjacent sheet has oppositely angled oblique major corrugations. The folds or ridges may have a configuration such as that of a gentle sinus line. Slots near the vertical edges reduce surface tension. The sheets may be held together by spacing ribbons bonded to the sheets.

In the prior art there is also disclosed contact body sheets having hollows and protuberances each in the shape of a frustum of a pyramid or a cone.

The prior art also discloses a corrugated metal sheet contact body for humidifiers. Each of the major corrugations of the contact body appears to have a plurality of minor, generally transversely oriented ridges or flutings along the length of the corrugation. There is also disclosed in the prior art a contact body of a similar configuration, except that a number of apertures are found throughout each sheet to help deflect descending liquid around the apertures for more uniform distribution of liquid over the surfaces of the sheets.

There is disclosed in the prior art a gas and liquid contact body comprising a plurality of parallel and generally vertical corrugated contact sheets. The corrugations form alternating apices in the sheets. Corrugations are disposed at an angle to the horizontal. The corrugations are substantially parallel and adjacent sheets are oriented such that the corrugations of one sheet cross the corrugations of an adjacent sheet at intersections of the apices. Recessed positioner pads are positioned in apices of the corrugations of the sheets such that at least about 80% of the intersections of adjacent sheets contain abutting pairs of the recessed positioner pads. While the recessed positioner pads facilitate alignment of the individual sheets within the contact body and may increase structural rigidity, the use of such pads reduces the space between adjacent sheets, thereby reducing the air flow between the sheets.

The prior art also discloses a gas and liquid contact body having a plurality of parallel and generally vertical corrugated contact sheets, similar to the contact body discussed immediately above. However, instead of recessed positioner pads, the contact body includes positioner pads formed at the intersection of apices of the corrugations of adjacent sheets. Each positioner pad includes a pair of raised bars generally transverse to the corrugations. The distance between the bars of each pair corresponds to the generally transverse dimension of an abutting positioner pad of an adjacent sheet. In addition, the top and bottom portions of each corrugation are angled with respect to the major portion of the corrugations. Each of the top and bottom portions of the corrugations has an axis which is perpendicular to the horizontal. The perpendicular top and bottom portions provide a more even stacking height than typical prior art contact bodies and increased structural rigidity.

However, it is desirable to have an easily aligned assembly of sheets as provided by the present invention of excellent structural integrity with increased air flow and liquid flow areas over typical prior art sheet assemblies.

SUMMARY OF THE INVENTION

According to the present invention, the above-mentioned deficiencies of the prior art are alleviated or eliminated by an assembly comprising a plurality of generally parallel corrugated sheets, the corrugations forming alternating apices in the sheets, the apices being connected by angled walls, the corrugations in each sheet being substantially parallel and disposed at an oblique angle to an edge of the sheet, adjacent sheets being oriented such that the corrugations of one sheet cross the corrugations of an adjacent sheet and intersections of the apices, the sheets having generally planar positioner pads positioned at least at some of the intersections of the apices of the corrugations of adjacent sheets, and the apices having indented portions between each positioner pad.

BRIEF DESCRIPTION OF THE DRAWINGS

The foregoing summary, as well as the following detailed description of the preferred embodiments, will be better understood when read in conjunction with the appended drawings. For the purpose of illustrating the invention, there is shown in the drawings an embodiment which is presently preferred, it being understood, however, that the invention is not limited to the specific arrangements and instrumentalities disclosed. In the drawings.

DESCRIPTION OF THE PREFERRED EMBODIMENTS

Certain terminology is used in the following description for convenience only and is not limiting. The words "horizontal" and "vertical" denote directions with respect to the orientation of the earth. The terminology includes the words above specifically mentioned, derivatives thereof, and words of similar import.

Figure 1:
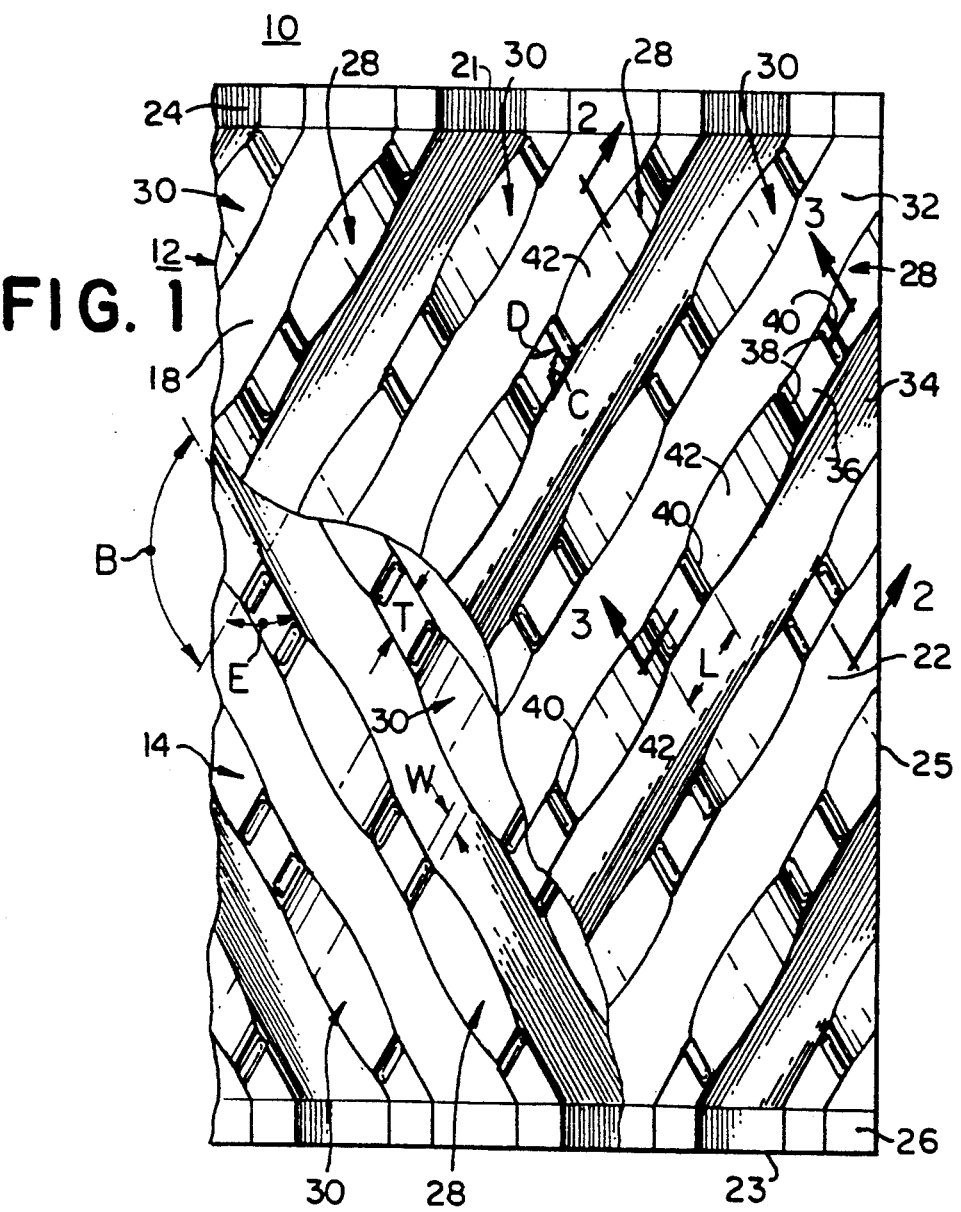
FIG. 1 is a partial front elevational view of a first embodiment of the assembly of the present invention, with the first sheet partly broken away to reveal the next adjacent sheet.
Figure 2:
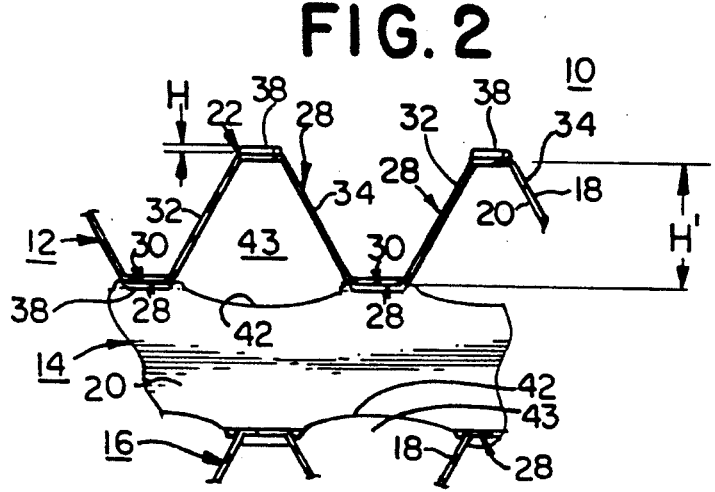
FIG. 2 is a partial cross-sectional view of the first embodiment of the assembly taken along line 2—2 of FIG. 1.
Figure 3:
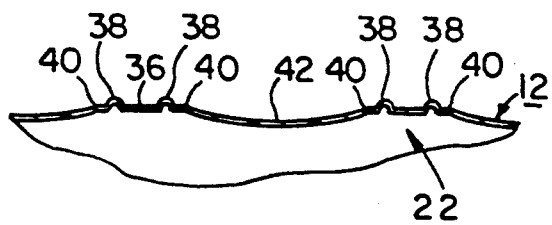
FIG. 3 is a partial cross-sectional view of the first embodiment of the assembly taken along line 3—3 of FIG. 1.

Referring to the drawings, wherein like numerals indicate like elements throughout the several views, there is shown in FIGS. 1-3 an embodiment of a portion of an assembly, generally designated 10, according to the present invention. FIG. 1 is a front elevational view of the assembly 10, showing a first sheet 12 which is partially broken away to show a second sheet 14 beneath the first sheet 12. In FIG. 2, an additional third sheet 16 is also shown for convenience, it being understood that the assembly 10 can comprise any number of sheets necessary or desirable for any particular purpose.

To explain the details of the assembly 10 of the present invention, the assembly 10 will be described with reference to its exemplary use as a gas and liquid contact body in a typical evaporative heat exchanger well known to those skilled in the art. A further description of the other components of the heat exchanger is not believed to be necessary to an understanding of the present invention and, therefore, further discussion of the heat exchanger will be omitted.

For use in an evaporative heat exchanger, the assembly 10 is preferably oriented such that the sheets are in a generally vertical direction. When the assembly 10 is used for other purposes, such as a modular artificial reef, the assembly 10 may be oriented in any desired direction. Preferably, the assembly 10 is also oriented in a generally vertical direction when used as an artificial reef, however, the assembly may also be oriented in a generally horizontal direction. The orientation of the assembly 10, when used as an artificial reef, depends upon such factors as the topography of the floor of the body of water upon which the reef is to be situated.

The assembly 10 of the present invention may be fabricated from sheets formed from a variety of different materials. For example, a thermoplastic material such as plasticized or unplasticized polyvinyl chloride, polystyrene, various other engineering thermoplastics and alloys of such materials may be used to form the present sheets. In addition, metals such as galvanized steel, aluminum, copper, materials such as asbestos or cellulose and composite materials such as fibrous cellulosic stock impregnated with a thermoplastic resin or the like may be used to form the sheets of the present invention. Presently, it is preferred that a synthetic polymer such as polyvinyl chloride be used to form the sheets.

Examples of other resins and engineering resins which may be used in accordance with the present invention include acetals, nylons, acrylonitrile-butadiene-styrene (ABS), styrene-acrylonitrile (SAN), polyphenylene oxides, polycarbonates, polyether sulphones, polyaryl sulphones, polyethylene, polystyrene, terephthalates, polyetherketones, polypropylenes, polysilicones, polyphenylene sulfides, polyionomers, polyepoxies, polyvinylidene halides, and the like. The choice of a particular material is determined by the application conditions, as will be recognized by those of ordinary skill in the art. For example, for use as an artificial reef, it is preferred that the sheets be formed from polyvinyl chloride to attract microbes which form the foundation of the reef food chain.

Individual sheets of the present assembly 10 may be manufactured by any conventional technique suited to the material from which the sheet is to be made. For example, the sheets may be thermally formed by conventional prior art processes such as pressure forming, vacuum forming, molding, hot stamping, or the like.

As best shown in FIG. 1, each of the sheets 12, 14 has a front face 18, which for the purposes of illustration, was arbitrarily designated to be the face visible in FIG. 1. Each sheet also has a rear face 20 (best illustrated in FIG. 2), the rear face being represented by the reverse side of the drawing sheet of FIG. 1. Each sheet also has a top edge 21 and a bottom edge 23 as well as opposed right side edge 25 and left side edge (not shown).

The contact sheets of the present invention are preferably assembled as described hereinafter from a plurality of substantially identical sheets in contact with each other. As best shown in FIG. 1, each sheet is corrugated throughout its width and height with a plurality of substantially parallel corrugations 22. The height H' of each corrugation 22 generally ranges from about 6.5 mm to about 61.0 mm, although the height H' may vary as desired.

A major portion of each corrugation 22 is angled with respect to the horizontal to provide for effective flow of liquid and gas through the assembly 10 and effective contact of the gas and liquid on and between the sheets. Although each corrugation 22 may be formed at any given angle throughout most or all of the height of the sheet depending upon the intended use of the assembly 10, the preferred angle is about 15° to about 60° with respect to the horizontal, and presently, the most preferred angle is about 60° to the horizontal.

Generally, it is preferred that the sheets be substantially identical to each other. It is also preferred that each sheet in the assembly 10 be oriented at an angle of 180° to each adjacent sheet.

As best shown in FIG. 1, in a presently preferred embodiment of the invention, the corrugations 22 are angled throughout most of the height of a sheet, except for a top portion 24 and a bottom portion 26 of the corrugations 22. The top portion 24 of the corrugations 22 and the bottom portion 26 of the corrugations 22 have edges 21 and 23, respectively, which are generally parallel to the horizontal. By orienting the top and bottom portions with respect to their corresponding corrugations 22 to be generally parallel to the horizontal, the horizontal stacking strength and structural integrity of the assembly 10 is increased. It is preferred for the manufacture and structural performance of the present invention that the top portion 24 of the corrugations and bottom portion 26 of the corrugations have edges which are parallel to the horizontal, at least when the assembly 10 is used as a wet deck fill in a countercurrent evaporative heat exchanger.

Each of the corrugations 22 comprises a peak 28 and a valley 30, as best illustrated in FIG. 2. It is preferred, but not essential, that the peaks 28 and valleys 30 be flattened, as illustrated, primarily to provide for more certain orientation and alignment of the sheets in the assembly 10. Adjacent peaks 28 and valleys 30 are connected by angled walls. Thus, for example, with reference to FIG. 2, with respect to peak 28 of sheet 12, the left-hand side of the corrugation 22 includes an angled wall 32 connecting peak 28 to valley 30. On the right-hand side of the same corrugation 22, an angled wall 34 connects peak 28 to valley 30. Since the designation "peak" for peak 28 and "valley" for valley 30 depends upon a viewer's reference point, the generic term "apex" (or the plural "apices") will be used to designate either of a peak 28 or a valley 30. This generic term is used because the peak of one sheet becomes a valley when that sheet is rotated 180° around a vertical axis and becomes part of the assembly 10. Nevertheless, front face 18 of each sheet will be deemed to be the face illustrated as facing the viewer in FIG. 1, even if the sheet is rotated such that front face 18 is away from the viewer.

The sheets may be assembled at a manufacturing plant or at the site where the assembly 10 is to be used. Since the sheets used to make the assembly 10 ar substantially identical, it is not necessary to describe each of the sheets 12, 14, 16. Also since the sheets are identical, they nest or stack with each other when aligned such that the front face 18 of one sheet, such as sheet 16, is in contact with rear face 20 of the next adjacent sheet, for example, sheet 12. However, in use, to form assembly 10, every other sheet is preferably rotated 180° around a vertical axis in front face-to-front face and rear face-to-rear face orientation with respect to adjacent sheets.

As best illustrated in FIG. 2, adjacent sheets of the assembly 10 are arranged such that rear face 20 of one sheet, for example, sheet 12 is in contact with rear face 20 of the next adjacent sheet, such as sheet 14. The original front face 18 of the sheet, for example, sheet 14, is in contact with the front face 18 of the opposed, next adjacent sheet, for example, sheet 16. In other words, because the sheets are in the front face-to-front face and rear face-to-rear face orientation, the original valleys 30 of adjacent sheets 12 and 14 contact each other, as do the original peaks 28 of adjacent sheets 14 and 16.

When assembled, the major portions of corrugations 22 extending along most or all of the height of the sheet at an oblique angle cross the corrugations 22 of an adjacent sheet at an oblique angle with portions of their apices in contact with each other. For example, in FIG. 1 the corrugations 22 of the first sheet 12 extend diagonally downwardly from the upper right toward the lower left of the sheet 12. The next adjacent sheet, for example second sheet 14, has corrugations 22 extending diagonally downwardly from the upper left toward the lower right of the sheet 14. This alternating pattern is repeated for each of the pairs of sheets forming the assembly 10.

In the illustrated presently preferred embodiment, the flattened apices of the corrugations of adjacent sheets are in contact with each other in the area of positioner pads 36. The positioner pads 36 are formed at least at some of the intersections of the apices of the corrugations 22 of adjacent sheets. Preferably, the positioner pads 36 are formed at each intersection of the apices of adjacent sheets. The generally planar positioner pads 36 provide increased contact area between adjacent sheets and facilitate alignment of individual sheets to form the assembly 10.

As shown in FIG. 1, a positioner pad 36 generally spans the width of the apex of a corrugation 22. However, the length "L" of the positioner pad 36 may vary as desired depending on the intended use of the assembly 10.

As also shown in FIG. 1, the positioner pad 36 preferably includes a pair of transverse, spaced, raised bars 38, each bar 38 being proximate an opposed transverse edge 40 of each positioner pad 36. The bars 38 of each pair are spaced from each other within the pair such that the distance between the bars 38 of each pair corresponds to the generally transverse dimension "T" of an abutting positioner pad 36 of an adjacent sheet. The bars 38 of each pair are preferably parallel and disposed at an obtuse angle "C", with respect to the oblique angle of the corrugations 22 equal to an obtuse angle "B" formed by intersecting corrugations of adjacent sheets. As shown in FIG. 1, the angle B is about 120°, however one of ordinary skill in the art will understand that the angle B at which the corrugations 22 of respective sheets are oriented may vary as desired. The bars 38 are also disposed at an obtuse angle "D" equal to the obtuse angle "E" formed by the intersection of corrugations 22. As presently preferred, angle E, which is supplementary to angle B, is about 60°. When the corrugations of adjacent sheets are oriented perpendicularly to one another, planar positioner pads 36 will be square or rectangular. When the corrugations on adjacent sheets are oriented at any other angle, the planar positioner pads will form a rhombus.

As shown in FIG. 2, the bars 38 preferably have a height H sufficient to retain between the pair of bars the interlocking positioner pad from an adjacent sheet. The height H of the bars preferably is from about 1 mm to about 4 mm, and more preferably, about 1.5 mm. For example, in a sheet having a height of about 35 mm, the bar height H may be about 2 mm. Preferably, in such a sheet, the width W (shown in FIG. 1) of each bar 38 is about 3 mm, although the bar width W may vary according to the intended use of the sheet.

The exact shape and size of the positioner pads 36 is determined by a number of factors, including the cross-sectional shape of the corrugations and the relative angle B at which the corrugations on adjacent sheets intersect each other.

The apices have indented portions 42 between each positioner pad 36. Preferably, each indented portion 42 is indented to an extent less than about 50% of the height H' of a corrugation 22. More preferably, the indented portions 42 are indented about 15% to about 25% of the height H' of a corrugation 22.

Figure 5:
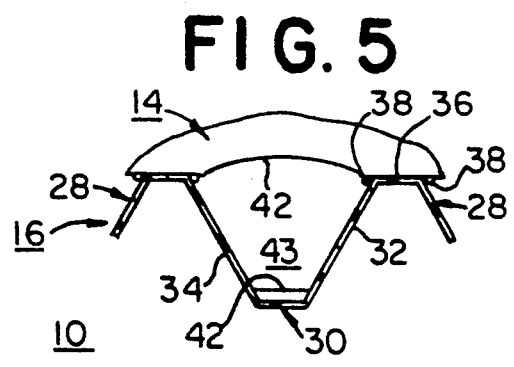
FIG. 5 is a partial cross-sectional view of the first embodiment of the assembly corresponding generally to FIG. 2, but showing a space between the second and third sheets.

The indented portions 42 provide a net increase in flow area by virtue of spaces 43 formed between oppositely facing indented portions 42, as best shown in FIGS. 2 and 5.

Figure 6:
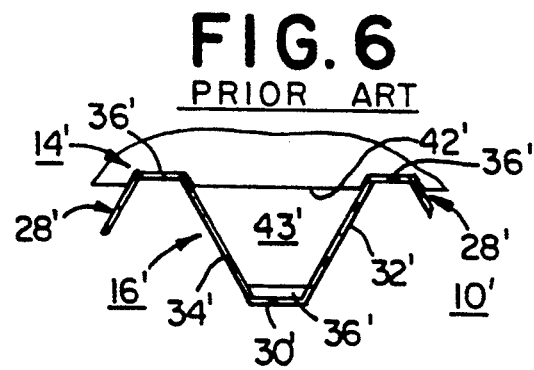
FIG. 6 is a partial cross-sectional view of a prior art assembly, generally corresponding to the view of the assembly shown in FIG. 5.

Prior art contact bodies which are assembled from a plurality of parallel and generally vertical contact sheets, having a plurality of parallel corrugations forming alternating apices in the contact sheets, and oriented such that the corrugations are disposed at an angle to the horizontal and such that the corrugations of adjacent sheets intersect one another, suffer from several disadvantages. FIG. 6 shows a typical prior art gas and liquid contact body 10' having recessed positioner pads 36'. The flow-through area indicated by space 43' of the prior art contact body 10' is substantially less than the flow-through area indicated by space 43 of an assembly 10 of the present invention, best shown in FIG. 5.

Figure 7:
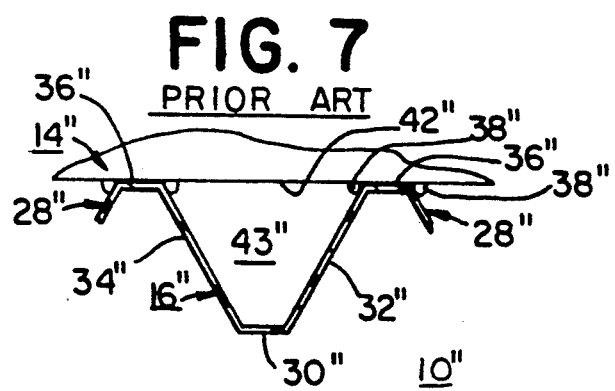
FIG. 7 is a partial cross-sectional view of another prior art assembly, generally corresponding to the view of the assembly shown in FIG. 5.

FIG. 7 shows another typical prior contact body 10" having positioner pads 36", each positioner pad 36" having a pair of raised bars 38" generally transverse to the corrugations. The flow-through area 43" of the other prior art contact body 10" is also less than the flow-through area 43 of the present assembly 10.

The indented portions 42 provide the sheets with greater structural integrity than prior art sheets without such indentations. The indented portions 42 enhance the structural integrity of the assembly 10 by providing added resistance to bending and flexing at the junction between the flattened apex of each corrugation 22 and the adjacent angled walls 32, 34. The net increase in flow area permits greater liquid and gas flow through the assembly 10 and reduces the pressure drop of liquid or gas flowing through the assembly. It is believed that the indentations 42 will increase the turbulence of the flow through the assembly 10, thus enhancing the mixing of gas and liquid, and accordingly, the thermal performance of such assemblies when used as wet deck fill in evaporative heat exchangers.

The indented portions 42 of the first embodiment of FIGS. 1-3 are preferably generally arcuate with respect to the longitudinal direction of the corrugation 22. The generally arcuate shape of the indented portions 42 of this embodiment is best shown in FIG. 3. The arcuate shape provides greater strength than if a planar or straight edge connected adjacent positioner pad edges 40 of adjacent pairs of positioner pads 36 in the same sheet. This is because an arcuate shape or edge resists bending, so that it tends not to function as a hinge, as would a planar or straight edge.

The generally arcuate indented portions 44 preferably have a radius of curvature of about H' to about 3H', and more preferably about 2H'. The ratio of lengths of the indented portions 42 along the axis of the corrugations 22 to the length L of positioner pads 36 along the apices containing the indented portions 42 and the positioner pads 36 are preferably about 1:1 to about 3:1. As one example, the height H, of corrugations 22 is 6.5 mm and the ratio of the length of the indented portions 42 to the length L of the positioner pads 36 is about 1:1. In another example, the height H, of the corrugations 22 is 61.0 mm and the ratio of the length of the indented portions 42 to the length L of the positioner pads 36 is about 3:1.

Figure 4:
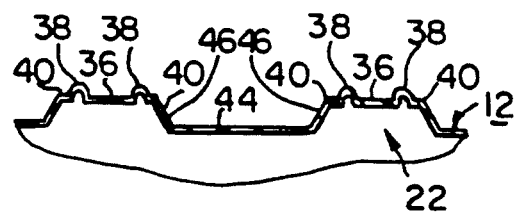
FIG. 4 is a partial cross-sectional view of an alternative embodiment of the assembly of the present invention, similar and generally corresponding to FIG. 3.

As best shown in FIG. 4, an alternative embodiment has indented portions 44 of each corrugation 22 with angled end walls 46 connecting an indented planar wall 48 to adjacent positioner pads 36 on the corrugation 22. Although the embodiment of FIG. 4 has an indented portion 44 having a planar indented wall 48, structural integrity is still increased compared to a sheet wherein a planar or straight edge connects adjacent edges 40 of adjacent positioner pads 36, where there is no indented portion between the adjacent positioner pads. This is because the indented planar walls 48 are located at a different, although preferably parallel, plane compared to the plane of the positioner pads 36, by virtue of the angled end walls 46.

The sheets may be bonded to each other by any suitable means, such as melt bonding, ultrasonic bonding, radio frequency bonding, adhesive bonding, thermal welding, or solvent bonding, for example. If desired, the sheets can be mechanically fastened together instead of bonded together. The presently preferred form of bonding is a solvent bond, such that portions of adjacent sheets which contact each other are adhesively bonded together at each intersecting positioner pad 36.

The assemblies of the present invention may be used in a wide variety of capacities, such as wet deck fill for contact bodies or as a modular artificial reef, or the other types of surface media discussed above. The positioner pads permit the individual sheets of the assembly to be easily aligned. The indented portions provide increased flow areas which enhance the thermal performance of a contact body formed from such an assembly and provide larger flow-through areas for aquatic life that otherwise would have required larger flute design. The indented portions also increase the structural integrity of the assembly, which in turn enhances flow through the assembly because the corrugations are less likely to collapse.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention as defined by the appended claims.

I claim:

1. An assembly comprising a plurality of generally parallel corrugated sheets, the corrugations forming alternating apices in the sheets, the apices being connected by angled walls, the corrugations in each sheet being substantially parallel and disposed at an oblique angle to an edge of the sheet, adjacent sheets being oriented such that the corrugations of one sheet cross the corrugations of an adjacent sheet at intersections of the apices, the sheets having generally planar positioner pads positioned at least at some of the intersections of the apices of the corrugations of adjacent sheets, and the apices having indented portions between each positioner pad.

2. An assembly according to claim 1, wherein the positioner pads are formed at each intersection of the apices of adjacent sheets.

3. An assembly according to claim 2, wherein the sheets comprising the assembly are fastened together by adhesive bonds between abutting positioner pads of each sheet.

4. An assembly according to claim 2, wherein the sheets comprising the assembly are fastened together by thermal welding between abutting positioner pads of each sheet.

5. An assembly according to claim 1, further comprising a pair of spaced, raised bars, each bar being proximate an opposed edge of each positioner pad, the bars being generally transverse to the corrugations, the bars of each pair being spaced from each other within the pair such that the distance between the bars of each pair corresponds to the generally transverse dimension of an abutting positioner pad of an adjacent sheet.

6. An assembly according to claim 5, wherein the bars of each pair are parallel and disposed at an angle with respect to the oblique angle of the corrugation equal to an angle formed by intersecting corrugations of adjacent sheets.

7. An assembly according to claim 1, wherein each indented portion is indented to an extent of less than about 50% of a height of a corrugation.

8. An assembly according to claim 7, wherein the indented portions are indented about 15% to about 25% of the height of the corrugation.

9. An assembly according to claim 1, wherein the indented portions are generally arcuate with respect to a longitudinal direction of the corrugation.

10. An assembly according to claim 9, wherein each corrugation has a height $H'$ and the generally arcuate indented portions have a radius of curvature of about $H'$ to about $3H'$.

11. An assembly according to claim 10, wherein each corrugation has a height $H'$ and the radius of curvature is about $2H'$.

12. An assembly according to claim 1, wherein the indented portions of each corrugation have angled end walls connecting an indented planar wall to adjacent positioner pads in the corrugation.

13. An assembly according to claim 1, wherein the ratio of the lengths of the indented portions to the positioner pads along the apices containing the indented portions and the positioner pads are about 1:1 to about 3:1.

14. An assembly according to claim 1, wherein the ratio of the lengths of the indented portions to the positioner pads is about 1.3:1.

* * * * *